(12) United States Patent
Chang et al.

(10) Patent No.: US 11,755,066 B2
(45) Date of Patent: Sep. 12, 2023

(54) FOLDABLE MECHANISM, ROLLABLE SCREEN STRUCTURE AND ELECTRONIC DEVICE

(71) Applicant: BEIJING XIAOMI MOBILE SOFTWARE CO., LTD., Beijing (CN)

(72) Inventors: Cheng Chang, Beijing (CN); Chengfang Sun, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/681,175

(22) Filed: Feb. 25, 2022

(65) Prior Publication Data

US 2023/0007950 A1     Jan. 12, 2023

(30) Foreign Application Priority Data

Jul. 7, 2021    (CN) .......................... 202110767807.8

(51) Int. Cl.
    *G06F 1/16*          (2006.01)

(52) U.S. Cl.
    CPC .......... *G06F 1/1616* (2013.01); *G06F 1/1652* (2013.01); *G06F 1/1681* (2013.01)

(58) Field of Classification Search
    CPC .... G06F 1/1616; G06F 1/1652; G06F 1/1681; G06F 1/1601; G09F 9/301; H04M 1/0237; H04M 1/0268; H04N 5/64
    See application file for complete search history.

(56) References Cited

U.S. PATENT DOCUMENTS

| | | | | |
|---|---|---|---|---|
| 9,864,412 B2 * | 1/2018 | Park | .................... | G06F 1/1652 |
| 10,362,690 B2 * | 7/2019 | Han | .................... | G02F 1/1333 |
| 10,534,402 B1 * | 1/2020 | Kim | .................... | H05K 5/0217 |
| 10,789,863 B2 * | 9/2020 | Song | .................... | H05K 1/189 |
| 10,890,947 B2 * | 1/2021 | Choi | .................... | H05K 5/0017 |

(Continued)

FOREIGN PATENT DOCUMENTS

| | | |
|---|---|---|
| CN | 110989281 A | 4/2020 |
| CN | 112925153 A | 6/2021 |
| EP | 3832630 A1 | 6/2021 |

OTHER PUBLICATIONS

European Patent Application No. 22158866.8, Search and Opinion dated Jul. 27, 2022, 10 pages.

(Continued)

*Primary Examiner* — Rockshana D Chowdhury
(74) *Attorney, Agent, or Firm* — COZEN O'CONNOR

(57) ABSTRACT

A foldable mechanism includes a first movable plate, a second movable plate and a linkage structure. The first movable plate is below and supports an object to be rolled. The second movable plate is spaced apart from the first movable plate along a first direction, is connected to a first end of the object to be rolled and is below and supports the object to be rolled. The linkage structure is movably connected between the first movable plate and the second movable plate. The first movable plate is configured to move along a second direction to drive the linkage structure to fold or unfold, and the linkage structure is configured to drive the second movable plate to move close to or away from the first movable plate along the first direction, so as to switch the object to be rolled between a rolled state and an unrolled state.

18 Claims, 3 Drawing Sheets

(56) References Cited

U.S. PATENT DOCUMENTS

| 10,976,778 B2* | 4/2021 | Pyo | G09F 9/301 |
| 11,229,128 B2* | 1/2022 | Kim | H05K 5/0017 |
| 11,455,916 B2* | 9/2022 | Lee | G06F 1/1652 |
| 2022/0004229 A1* | 1/2022 | Guo | G06F 1/1652 |

OTHER PUBLICATIONS

Japanese Patent Application No. 2022-030087, Office Action dated Jan. 20, 2023, 7 pages.
Japanese Patent Application No. 2022-030087, English translation of Office Action dated Jan. 20, 2023, 7 pages.

\* cited by examiner

FOLDABLE MECHANISM, ROLLABLE SCREEN STRUCTURE AND ELECTRONIC DEVICE

CROSS-REFERENCE TO RELATED APPLICATION

This application is based on and claims priority to the Chinese Patent Application No. 202110767807.8 filed on Jul. 7, 2021, the entire content of which is incorporated herein by reference.

BACKGROUND

A rollable screen refers to a flexible OLED (Organic Light-Emitting Diode). The successful mass production of the rollable screen significantly facilitates the manufacturing of a new generation of a high-end smart phone. In the future, the rollable screen will be widely used along with continuous penetration of personal intelligent terminals.

SUMMARY

The present disclosure relates to a field of screen display, and more particularly to a foldable mechanism, a rollable screen structure and an electronic device.

In a first aspect, the present disclosure provides a foldable mechanism, including: a first movable plate being below an object to be rolled and supporting the object to be rolled; a second movable plate spaced apart from the first movable plate along a first direction, connected to a first end of the object to be rolled, being below and supporting the object to be rolled; and a linkage structure movably connected between the first movable plate and the second movable plate. The first movable plate is configured to move forward along a second direction to drive the linkage structure to fold, and the linkage structure is configured to drive the second movable plate to move close to the first movable plate along the first direction when the object to be rolled is switched from an unrolled state to a rolled state, in which the second direction is perpendicular to the first direction. The first movable plate is configured to move reversely along the second direction to drive the linkage structure to unfold, and the linkage structure is configured to drive the second movable plate to move away from the first movable plate along the first direction when the object to be rolled is switched from the rolled state to the unrolled state.

In a second aspect, the present disclosure provides a rollable screen structure, including: a rollable screen; a first movable plate being below and supporting the rollable screen; a second movable plate spaced apart from the first movable plate along a first direction, connected to a first end of the rollable screen, and being below and supporting the rollable screen; and a linkage structure movably connected between the first movable plate and the second movable plate. The first movable plate is configured to move forward along a second direction to drive the linkage structure to fold, and the linkage structure is configured to drive the second movable plate to move close to the first movable plate along the first direction when the rollable screen is switched from an unrolled state to a rolled state, in which the second direction is perpendicular to the first direction. The first movable plate is configured to move reversely along the second direction to drive the linkage structure to unfold, and the linkage structure is configured to drive the second movable plate to move away from the first movable plate along the first direction when the rollable screen is switched from the rolled state to the unrolled state.

In a third aspect, the present disclosure provides an electronic device, including: a housing; and a rollable screen structure coupled to the housing. The rollable screen structure includes: a rollable screen; a first movable plate being below and supporting the rollable screen; a second movable plate spaced apart from the first movable plate along a first direction, connected to a first end of the rollable screen, and being below and supporting the rollable screen; and a linkage structure movably connected between the first movable plate and the second movable plate. The first movable plate is configured to move forward along a second direction to drive the linkage structure to fold, and the linkage structure is configured to drive the second movable plate to move close to the first movable plate along the first direction when the rollable screen is switched from an unrolled state to a rolled state, so as to retract the first end of the rollable screen to the housing. The second direction is perpendicular to the first direction. The first movable plate is configured to move reversely along the second direction to drive the linkage structure to unfold, and the linkage structure is configured to drive the second movable plate to move away from the first movable plate along the first direction when the rollable screen is switched from the rolled state to the unrolled state, so as to move the first end of the rollable screen away from the housing.

DETAILED DESCRIPTION

Figure 1:
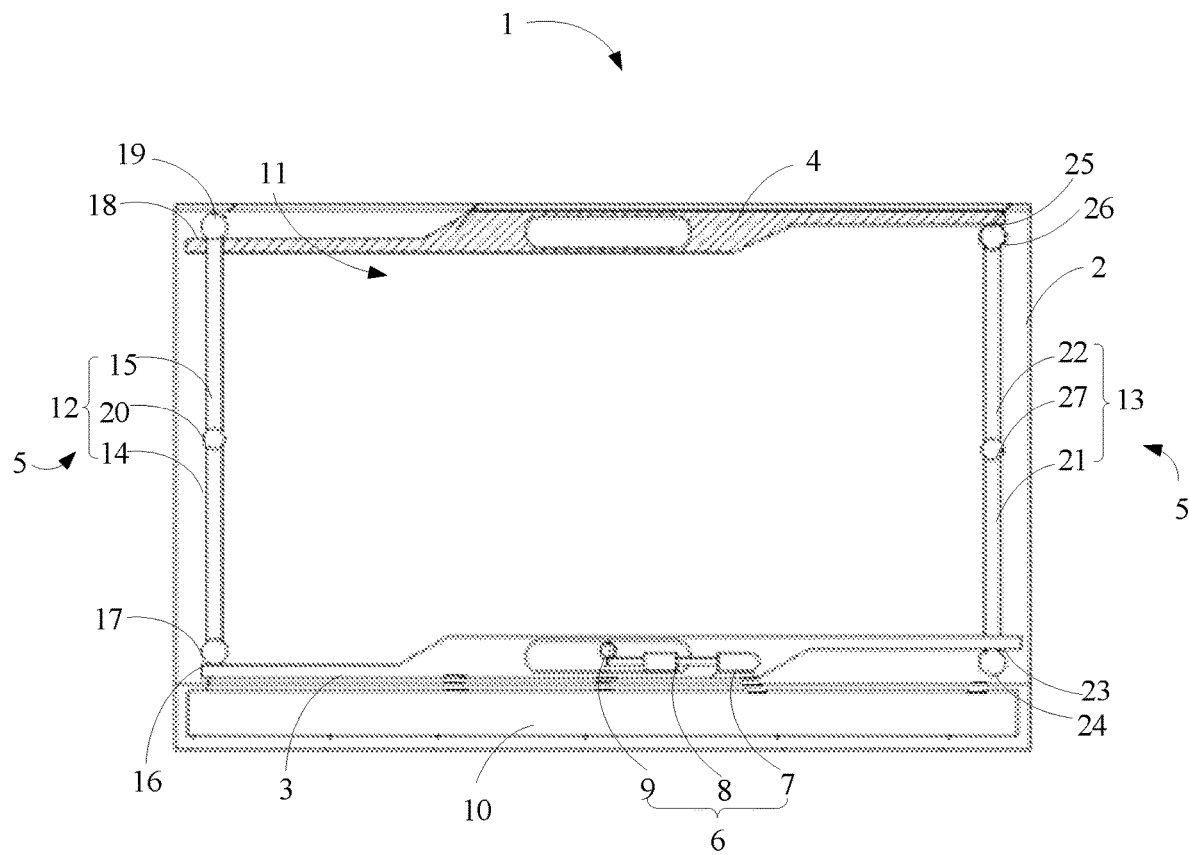
FIG. 1 is a schematic view of a rollable screen in an unrolled state of an electronic device according to the present disclosure.

Embodiments of the present disclosure will be described in detail herein, and the examples thereof are illustrated in the accompanying drawings. When the description below concerns the drawings, same numbers in different drawings represent same or similar elements unless indicated otherwise. The implementations described in the following embodiments do not represent all embodiments consistent with the present disclosure. Instead, they are merely examples of devices and methods consistent with some aspects of the present disclosure as detailed in the appended claims.

The terms used in the present disclosure are merely for the purpose of describing specific embodiments, which are not intended to limit the present disclosure. Unless defined otherwise, the technical or scientific terminologies used in the present disclosure shall be the general meaning understood by those skilled in the related art of the present disclosure. Terms such as "first", "second" and the like used in the descriptions and claims of the present disclosure do not indicate any order, quantity or importance, but are only used to distinguish different components. Similarly, terms such as "one" or "a" do not refer to quantity limitation, but to indicate the existence of at least one. Term "a plurality" or "several" means two and more than two. Unless specified otherwise, terms such as "front", "rear", "lower" and/or "upper", and the like are merely for convenience of description, and are not limited to one position or one spatial orientation. Terms such as "comprise" or "include" and the like mean that the elements or objects presented before "comprise" or "include" contain the elements or objects presented after "comprise" or "include" and their equivalents, which do not exclude other elements or objects. The terms "coupled", "connected" and the like are not restricted to physical or mechanical connections, can also be electrical connections, no matter direct or indirect. As used in the descriptions and the appended claims of the present disclosure, "a", "the" and "this" in singular forms mean including plural forms, unless clearly indicated in the context otherwise. It should also be understood that, as used herein, the term "and/or" represents and contains any and all possible combinations of one or more associated listed items.

A rollable phone in the related art is an upgrade based on a foldable screen to achieve expansion in a part of display, i.e., the expansion or reduction of a plane area. Although an electronic product in the related art may achieve a function of switching a size of a display area, a form of the electronic product as a whole does not allow the screen to be retracted or extended completely and can only achieve the function of partial retraction or extension.

The present disclosure provides a foldable mechanism, including a first movable plate, a second movable plate and a linkage structure. The first movable plate is arranged below and supports an object to be rolled. The second movable plate is spaced apart from the first movable plate along a first direction. The second movable plate is connected to a first end of the object to be rolled, arranged below and supports the object to be rolled. The linkage structure is movably connected between the first movable plate and the second movable plate. The first movable plate moves along a second direction to drive the linkage structure to fold or unfold, and the linkage structure drives the second movable plate to move close to or away from the first movable plate along the first direction, so as to switch the object to be rolled between a rolled state and an unrolled state. The second direction is perpendicular to the first direction.

In the foldable mechanism provided by the present disclosure, the linkage structure is driven to fold or unfold through the horizontal movement of the first movable plate, and further the second movable plate is driven to move close to or away from the first movable plate. In this way, the object to be rolled can be switched between the rolled state and the unrolled state. The object to be rolled may be a screen, so as to realize a function of mutual cooperation between the rolled states of the screen and a whole machine, thus achieving a purpose of a screen scaling function in a complete state and reducing an appearance of the whole machine.

The present disclosure further provides a rollable screen structure, including a rollable screen and the above foldable mechanism. The first movable plate is arranged below and supports the rollable screen. The second movable plate is connected to a first end of the rollable screen, arranged below and supports the rollable screen. The first movable plate moves along the second direction to drive the linkage structure to fold or unfold, and the linkage structure drives the second movable plate to move close to or away from the first movable plate along the first direction, so as to switch the rollable screen between a rolled state and an unrolled state. Following descriptions are made by taking an example in which the object to be rolled is the rollable screen.

In the rollable screen structure provided by the present disclosure, the linkage structure is driven to fold or unfold through the horizontal movement of the first movable plate, and further the second movable plate is driven to move close to or away from the first movable plate. In this way, the rollable screen can be switched between the rolled state and the unrolled state, so as to realize the function of mutual cooperation between the rolled states of the screen and the whole machine, thus achieving the purpose of the screen scaling function in the complete state and reducing the appearance of the whole machine.

The present disclosure further provides an electronic device, including a housing and a rollable screen structure arranged to the housing. When the rollable screen is switched from the unrolled state to the rolled state, the first movable plate moves forward along the second direction to drive the linkage structure to fold, and the linkage structure drives the second movable plate to move close to the first movable plate along the first direction, such that the first end of the rollable screen is retracted to the housing. When the rollable screen is switched from the rolled state to the unrolled state, the first movable plate moves reversely along the second direction to drive the linkage structure to unfold, and the linkage structure drives the second movable plate to move away from the first movable plate along the first direction, such that the first end of the rollable screen gradually moves away from the housing.

In the electronic device provided by the present disclosure, the linkage structure is driven to fold or unfold through the horizontal movement of the first movable plate, and further the second movable plate is driven to move close to or away from the first movable plate, so as to realize the folding or unfolding of the rollable screen. In this way, the rollable screen can be switched between the rolled state and the unrolled state, so as to realize the function of mutual cooperation between the rolled states of the screen and the whole machine, thus achieving the purpose of the screen scaling function in the complete state and reducing the appearance of the whole machine.

Figure 2:
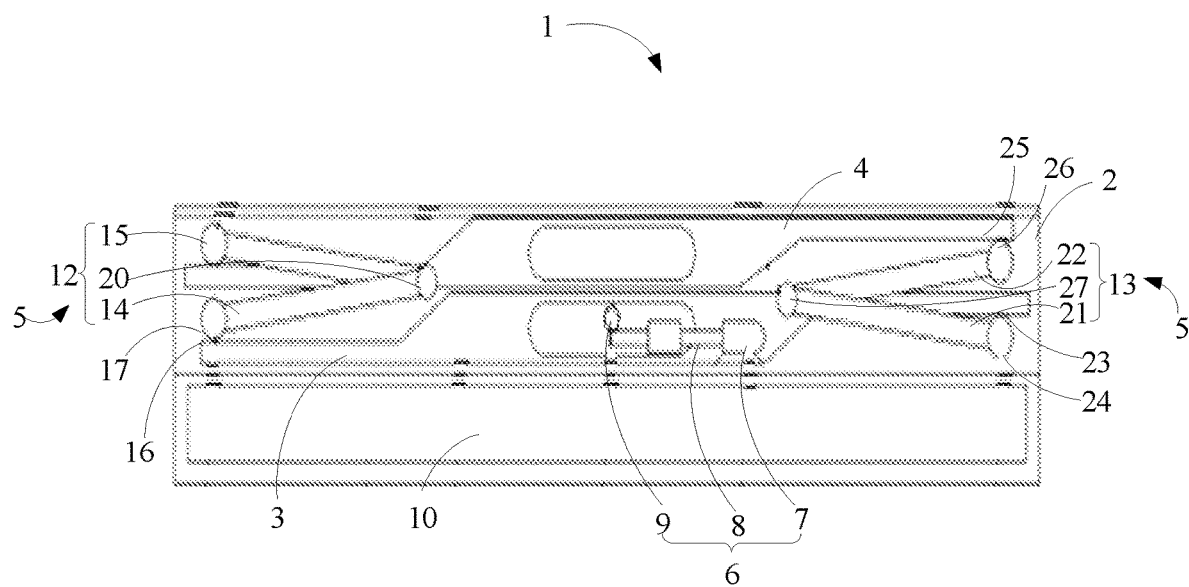
FIG. 2 is a schematic view of the rollable screen in a rolled state of the electronic device shown in FIG. 1.

FIG. 1 is a schematic view of a rollable screen in an unrolled state of an electronic device provided by the present disclosure. FIG. 2 is a schematic view of the rollable screen in a rolled state of the electronic device shown in FIG. 1. As shown in FIGS. 1 and 2, the electronic device 1 includes a housing 10 and a rollable screen structure 11. The rollable screen structure 11 includes a rollable screen 2, a first movable plate 3, a second movable plate 4 and a linkage structure 5. The first movable plate 3 is arranged below and supports the rollable screen 2. The second movable plate 4 is spaced apart from the first movable plate 3 in a first direction (a vertical direction in FIG. 1). The second movable plate 4 is connected to a first end of the rollable screen 2 (an upper end of the rollable screen 2 in FIG. 1), arranged below and supports the rollable screen 2. The linkage structure 5 is movably connected between the first movable plate 3 and the second movable plate 4. The first movable plate 3 moves along a second direction (a horizontal direction in FIG. 1) to drive the linkage structure 5 to fold or unfold, and the linkage structure 5 drives the second movable plate 4 to move close to or away from the first movable plate 3 along the first direction, so as to switch the rollable screen 2 between a rolled state and an unrolled state. The second direction is perpendicular to the first direction. In the related art, a whole state of an intelligent terminal cannot be rolled completely and can merely be rolled partially. Thus, a volume of the whole machine in this form is relatively large and needs to be further improved. In this embodiment, the housing 10 is connected to the rollable screen structure 11. Specifically, the first movable plate 3 is adjacent to and connected to the housing 10. The second movable plate 4 is spaced apart from the first movable plate 3 along the first direction (the vertical direction in FIG. 1) and is connected to the rollable screen 2. Moreover, the linkage structure 5 is connected between the first movable plate 3 and the second movable plate 4. The second direction includes a horizontal leftward direction and a horizontal rightward direction. The first direction includes a vertical upward direction and a vertical downward direction. In an example shown in the drawings, when the rollable screen 2 is switched from the unrolled state to the rolled state, the first movable plate 3 moves in the horizontal leftward direction and drives the linkage structure 5 to fold, so as to further drive the second movable plate 4 to move in the horizontal rightward direction and move close to the first movable plate 3; when the rollable screen 2 is switched from the rolled state to the unrolled state, the first movable plate 3 moves in the horizontal rightward direction and drives the linkage structure 5 to unfold, so as to further drive the second movable plate 4 to move in the horizontal leftward direction and move away from the first movable plate 3. That is, the first movable plate 3 moves leftward to drive the rollable screen 2 to be rolled. The first movable plate 3 moves rightward to drive the rollable screen 2 to be unrolled. In this way, the rollable screen 2 can be switched between the rolled state and the unrolled state, so as to realize the function of mutual cooperation between the rolled states of the screen and the whole machine, thus achieving the purpose of the screen scaling function in the complete state and reducing the appearance of the whole machine. It should be noted that, in another embodiment (not shown), the first movable plate 3 moves leftward to drive the rollable screen 2 to be unrolled, and the first movable plate 3 moves rightward to drive the rollable screen 2 to be rolled. The whole movement process is opposite to that of the above embodiment, which will be described in detail below.

In some embodiments, the rollable screen 2 includes a polyimide film material and/or a polyester film material and/or a cycloolefin polymer film material and/or a liquid crystal polymer film material and/or a PE protective film material and/or a polydimethylsiloxane film material, which is beneficial to improving the quality of the rollable screen 2.

Figure 3:
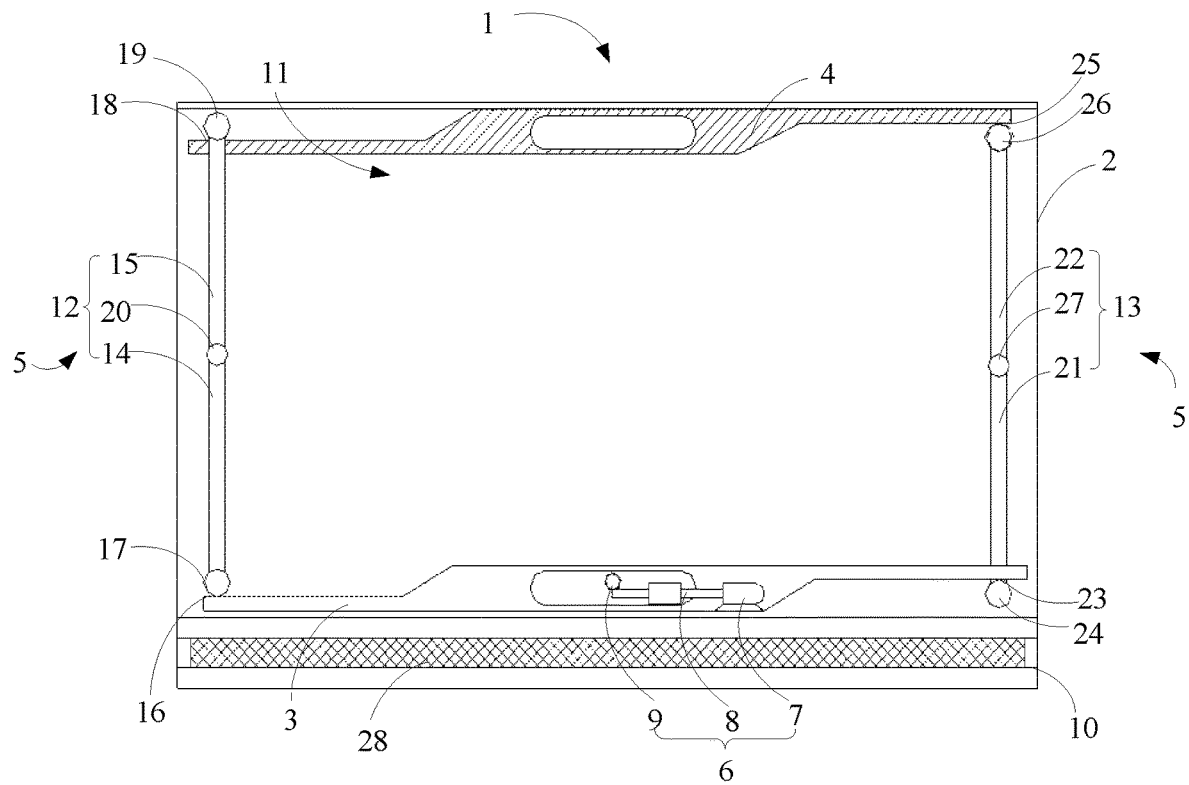
FIG. 3 is a sectional view of a rollable screen structure of the electronic device shown in FIG. 1.
Figure 4:
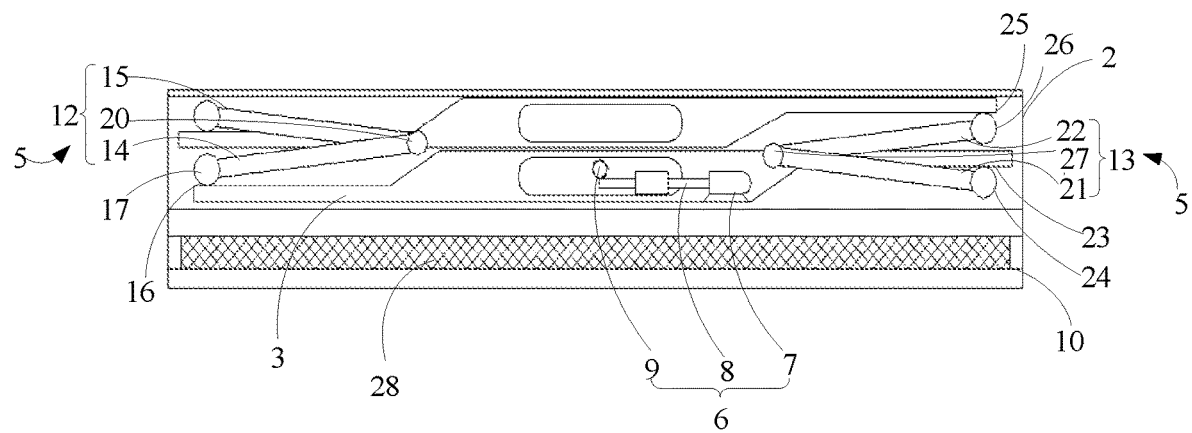
FIG. 4 is a sectional view of a rollable screen structure of the electronic device shown in FIG. 2.

FIG. 3 is a sectional view of the rollable screen structure of the electronic device shown in FIG. 1. FIG. 4 is a sectional view of the rollable screen structure of the electronic device shown in FIG. 2. As shown in FIGS. 3 and 4, in some embodiments, the rollable screen structure 11 further includes a rotating shaft 28 arranged in the housing 10. A second end of the rollable screen 2 (an end opposite to the upper end of the rollable screen 2 in FIG. 1) is connected to the rotating shaft 28 and configured to be rolled around the rotating shaft 28. When the rollable screen 2 is switched from the unrolled state to the rolled state, the rotating shaft 28 rotates to gradually roll the second end of the rollable screen 2 onto the rotating shaft 28 and into the housing 10, that is, the second end of the rollable screen 2 and a part of the rollable screen 2 adjoining the second end of the rollable screen 2 are rolled onto the rotating shaft 28 and into the housing 10. When the rollable screen 2 is switched from the rolled state to the unrolled state, the rotating shaft 28 rotates to gradually roll the second end of the rollable screen 2 off the rotating shaft 28 and out of the housing 10, that is, the second end of the rollable screen 2 and the part of the rollable screen 2 adjoining the second end of the rollable screen 2 are rolled off the rotating shaft 28 and out of the housing 10. In this embodiment, the rotating shaft 28 is arranged inside the housing 10 and connected to the second end of the rollable screen 2, and the second end of the rollable screen 2 is arranged opposite to the first end of the rollable screen 2. When the rollable screen 2 switches from the unrolled state to the rolled state, the first end of the rollable screen 2 retracts to the housing 10 and drives the rotating shaft 28 to rotate, such that the second end of the rollable screen 2 is gradually rolled onto the rotating shaft 28 and into the housing 10. When the rollable screen 2 is switched from the rolled state to the unrolled state, the first end of the rollable screen 2 gradually moves away from the housing 10 and drives the rotating shaft 28 to rotate, such that the second end of the rollable screen 2 is gradually rolled off the rotating shaft 28 and out of the housing 10.

Further, the rotating shaft 28 is located on a side of the foldable mechanism away from the rollable screen 2, that is, the rollable screen 2 is located on one side of the foldable mechanism, and the rotating shaft 28 is located on the other side of the foldable mechanism, so as to make rational use of an internal space of the housing 10. In the examples shown in FIGS. 3 and 4, the rotating shaft 28 is spaced apart from the foldable mechanism along the first direction. In this embodiment, the rotating shaft 28 is spaced part from the foldable mechanism along the first direction and is located on a side adjacent to the first movable plate 3, which is beneficial for the rolling or unrolling of the rollable screen 2 without occupying a longitudinal space inside the housing 10, thus facilitating the structural design of the miniaturization of the whole machine.

By the arrangement of the rotating shaft 28, when the second movable plate 4 moves close to the first movable plate 3, the rollable screen 2 is retracted into or extends out of the housing 10 through the rotating shaft 28. The rotating shaft 28 may cooperate with the foldable mechanism to better realize the rolling or unrolling of the rollable screen 2. In addition, the rotating shaft 28 is configured to store and sort the rollable screen 2, so as to avoid jamming and damage of the rollable screen 2 during its rolling or unrolling. It may be understood that the rotating shaft 28 may act as a roller and rotate with the unrolling or rolling of the rollable screen 2. It may also be understood that the working principle of the rolling or unrolling of the rollable screen 2 is similar to that of a tape measure.

In some embodiments, when the rollable screen 2 switches from the unrolled state to the rolled state, the first movable plate 3 moves forward along the second direction and drives the linkage structure 5 to fold, and the linkage structure 5 drives the second movable plate 4 to move close to the first movable plate 3 along the first direction, so as to gradually retract the first end of the rollable screen 2 to the housing 10. When the rollable screen 2 is switched from the rolled state to the unrolled state, the first movable plate 3 moves reversely along the second direction to drive the linkage structure 5 to unfold, and the linkage structure 5 drives the second movable plate 4 to move away from the first movable plate 3 along the first direction, so as to move the first end of the rollable screen 2 away from the housing 10. In this embodiment, when the rollable screen 2 is switched from the unrolled state to the rolled state, the first movable plate 3 moves forward along the second direction (as shown in FIG. 1, the first movable plate 3 moves in the horizontal leftward direction), and drives the linkage structure 5 to fold, so as to further drive the second movable plate 4 to move in the horizontal rightward direction and move close to the first movable plate 3. When the rollable screen 2 is switched from the rolled state to the unrolled state, the first movable plate 3 moves reversely along the second direction (as shown in FIG. 1, the first movable plate 3 moves in the horizontal rightward direction), and drives the linkage structure 5 to unfold, so as to further drive the second movable plate 4 to move in the horizontal leftward direction and move away from the first movable plate 3. In this way, the rollable screen 2 can be switched between the rolled state and the unrolled state, so as to realize the function of mutual cooperation between the rolled states of the screen and the whole machine, thus achieving the purpose of the screen scaling function in the complete state, and reducing the appearance of the whole machine.

As also illustrated in FIG. 1, in some embodiments, the rollable screen structure 11 further includes a driving assembly 6 connected to the first movable plate 3 for driving the first movable plate 3 to move along the second direction. In this embodiment, the driving assembly 6 is connected to the first movable plate 3. When the driving assembly 6 rotates clockwise, the first movable plate 3 is driven to move in the horizontal leftward direction. When the driving assembly 6 rotates counterclockwise, the first movable plate 3 is driven to move in the horizontal rightward direction. In this way, the effect of mutual cooperation between the driving assembly 6 and the first movable plate 3 is good.

In some embodiments, the driving assembly 6 includes a motor 7, a first transmission member 8 connected to the motor 7, and a second transmission member 9 connected to the first transmission member 8, and the second transmission member 9 is connected to the first movable plate 3. The motor 7 rotates clockwise to drive the first transmission member 8 to rotate clockwise, the first transmission member 8 drives the second transmission member 9 to move away from the motor 7 along the second direction (i.e. translating leftward), and the second transmission member 9 drives the first movable plate 3 to move forward along the second direction. The motor 7 rotates counterclockwise to drive the first transmission member 8 to rotate counterclockwise, the first transmission member 8 drives the second transmission member 9 to move close to the motor 7 along the second direction (i.e. translating rightward), and the second transmission member 9 drives the first movable plate 3 to move reversely along the second direction. In this embodiment, the driving assembly 6 includes the motor 7, the first transmission member 8 and the second transmission member 9. The first transmission member 8 is connected between the motor 7 and the second transmission member 9. The second transmission member 9 is fixed to the first movable plate 3. The first transmission member 8 is driven by the motor 7 to drive the second transmission member 9 to rotate. Further, since the second transmission member 9 is connected to the first movable plate 3, when the second transmission member 9 rotates, the first movable plate 3 is pushed to move horizontally. Specifically, when the rollable screen 2 is switched from the unrolled state to the rolled state, the motor 7 rotates clockwise to drive the second transmission member 9 to rotate clockwise, so as to move the first movable plate 3 in the horizontal leftward direction. When the rollable screen 2 is switched from the rolled state to the unrolled state, the motor 7 rotates counterclockwise to drive the second transmission member 9 to rotate counterclockwise, so as to move the first movable plate 3 in the horizontal rightward direction. In this way, the motor 7 and the two transmission members control the first movable plate 3 to move in the horizontal leftward direction or in the horizontal rightward direction, such that the motor 7, the first transmission member 8 and the second transmission member 9 cooperate in turn to rotate, so as to push the first movable plate 3 to move horizontally, with a simple structure and a good transmission effect. In some embodiments, the second transmission member 9 is fixed to the first movable plate 3 by welding.

In some embodiments, the first transmission member 8 is a screw rod, and the second transmission member 9 is a nut fitted with the screw rod. The screw rod extends along the second direction. In this embodiment, the first transmission member 8 is a cylindrical screw rod and the second transmission member 9 may be a nut. The screw rod is driven to rotate by the motor 7, so as to transmit power to the nut to rotate the nut and further to push the first movable plate 3 to move in the horizontal direction. Moreover, the screw rod extends along the second direction, that is, an extension direction of the screw rod is in the same straight line as an extension direction of the first movable plate 3. In this way, a driving force of the motor 7 is transmitted to the nut through the screw rod and further transmitted to the first movable plate 3, so as to reduce loss during transmission of the driving force, thus achieving a better effect of pushing the first movable plate 3.

In some embodiments, the first transmission member 8 is a screw rod, the second transmission member 9 is a gear fitted with the screw rod, and the screw rod extends along the second direction. In this embodiment, the first transmission member 8 is still a cylindrical screw rod, and the second transmission member 9 may be a gear. The so-called gear is a mechanical element with gears on its rim to continuously mesh for transmitting motion and power. The motor 7 drives the screw rod to rotate, so as to drive the gear to rotate. By the arrangement of the gear rotation, the power transmission is improved. Compared with the above nut, the gear can more meet the power to push the first movable plate 3 and effectively improve the stability of the rolling or unrolling of the rollable screen 2.

In some embodiments, the first transmission member 8 is a gear, the second transmission member 9 is a rack fitted with the gear, and the rack extends along the second direction. In this embodiment, the first transmission member 8 is configured as a gear, and the second transmission member 9 is a rack. The motor 7 drives the gear to rotate, so as to transmit power to the rack to rotate the rack, and further to push the first movable plate 3 to move in the horizontal direction. Similarly, an extension direction of the rack is the same with that of the first movable plate 3. In this way, the driving force of the motor 7 is transmitted to the rack through the gear and further transmitted to the first movable plate 3, so as to reduce loss during transmission of the driving force, thus achieving a better effect of pushing the first movable plate 3.

In some embodiments, the linkage structure 5 includes a first linkage assembly 12 and a second linkage assembly 13. The first linkage assembly 12 is movably connected to a first end of the first movable plate 3 (a left end of the first movable plate 3 in FIG. 1) and a first end of the second movable plate 4 (a left end of the second movable plate 4 in FIG. 1). The second linkage assembly 13 is movably connected to a second end of the first movable plate 3 (a right end of the first movable plate 3 in FIG. 1) and a second end of the second movable plate 4 (a right end of the second movable plate 4 in FIG. 1). The first movable plate 3 moves forward (leftward as shown in FIG. 1) along the second direction and drives the first linkage assembly 12 and the second linkage assembly 13 to fold, so as to drive the second movable plate 4 to move close to the first movable plate 3 along the first direction. The first movable plate 3 moves reversely (rightward as shown in FIG. 1) along the second direction and drives the first linkage assembly 12 and the second linkage assembly 13 to unfold, so as to drive the second movable plate 4 to move away from the first movable plate 3 along the first direction. In this embodiment, the rollable screen 2 is rolled or unrolled by arranging two sets of linkage assemblies. Specifically, the first linkage assembly 12 and the second linkage assembly 13 are connected between the first movable plate 3 and the second movable plate 4, respectively, and arranged opposite to each other. When the rollable screen 2 is switched from the unrolled state to the rolled state, the driving assembly 6 rotates clockwise to push the first movable plate 3 to move forward along the second direction (as shown in FIG. 1, the first movable plate 3 moves in the horizontal leftward direction), so as to drive the first linkage assembly 12 and the second linkage assembly 13 to fold, and the second movable plate 4 is further driven to move close to the first movable plate 3 in the vertical direction, such that the rollable screen 2 can be retracted into the housing 10. When the rollable screen 2 is switched from the rolled state to the unrolled state, the driving assembly 6 rotates counterclockwise to push the first movable plate 3 to move reversely along the second direction (as shown in FIG. 1, the first movable plate 3 moves in the horizontal rightward direction), so as to drive the first linkage assembly 12 and the second linkage assembly 13 to switch from a folded state to an unfolded state, and the second movable plate 4 is further driven to move away from the first movable plate 3 in the vertical direction, such that the rollable screen 2 can extend out of the housing 10.

Figure 5:
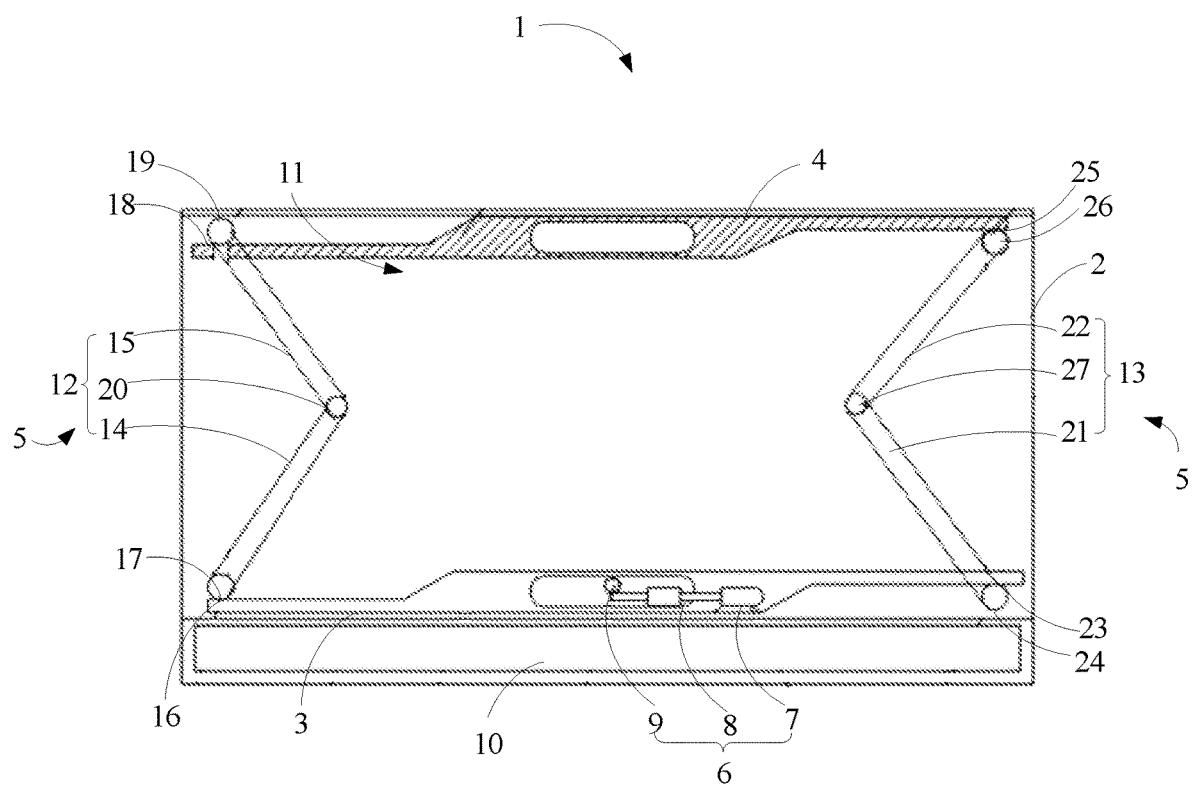
FIG. 5 is a schematic view of a first linkage assembly and a second linkage assembly of a linkage structure of an electronic device during folding or unfolding.

FIG. 5 is a schematic view of a first linkage assembly and a second linkage assembly of a linkage structure shown in FIG. 1 during folding or unfolding. As shown in FIG. 5, in some embodiments, the first linkage assembly 12, of the linkage structure 5, includes a first bar 14 and a second bar 15. A first end of the first bar 14 is hinged with the first movable plate 3. A first end of the second bar 15 is hinged with the second movable plate 4. A second end of the second bar 15 is hinged with a second end of the first bar 14. The first movable plate 3 moves forward along the second direction to drive the first bar 14 to rotate clockwise, and the first bar 14 drives the second bar 15 to rotate counterclockwise to fold the first linkage assembly 12. The first movable plate 3 moves reversely along the second direction to drive the first bar 14 to rotate counterclockwise, and the first bar 14 drives the second bar 15 to rotate clockwise to unfold the first linkage assembly 12. In this embodiment, the first linkage assembly 12 is folded and unfolded by two hinged bars. Specifically, the first end of the first bar 14 (a bottom end of the first bar 14 shown in FIG. 1) is connected to a left end of the first movable plate 3, the first end of the second bar 15 (a top end of the second bar 15 shown in FIG. 1) is connected to the second movable plate 4, and the second end of the first bar 14 (a top end of the first bar 14 in FIG. 1) is hinged with the second end of the second bar 15 (a bottom end of the second bar 15 in FIG. 1). When the rollable screen 2 is switched from the unrolled state to the rolled state, the driving assembly 6 rotates clockwise to push the first movable plate 3 to move in the horizontal leftward direction, so as to further drive the first bar 14 to rotate clockwise and the second bar 15 to rotate counterclockwise, such that the first linkage assembly 12 is folded. When the rollable screen 2 is switched from the rolled state to the unrolled state, the driving assembly 6 rotates counterclockwise to push the first movable plate 3 to move in the horizontal rightward direction, so as to further drive the first bar 14 to rotate counterclockwise and the second bar 15 to rotate clockwise, such that the first linkage assembly 12 is unfolded.

In some embodiments, the first movable plate 3 is provided with a first tooth portion 16, and the first linkage assembly 12 further includes a first gear 17 fitted with the first tooth portion 16. The first gear 17 is connected to the first end of the first bar 14 and is connected to the first tooth portion 16. In this embodiment, the first gear 17 is arranged to the bottom end of the first bar 14, and abuts against the left end of the first movable plate 3. When the rollable screen 2 is switched from the unrolled state to the rolled state, the driving assembly 6 rotates clockwise to push the first movable plate 3 to move in the horizontal leftward direction. Further, the first movable plate 3 drives the first gear 17 to rotate, thus folding the first linkage assembly 12.

In some embodiments, the second movable plate 4 is provided with a second tooth portion 18, and the first linkage assembly 12 further includes a second gear 19 fitted with the second tooth portion 18. The second gear 19 is connected to the first end of the second bar 15 and is connected to the second tooth portion 18. In this embodiment, the second gear 19 is arranged to the top end of the second bar 15 and abuts against the left end of the second movable plate 4. When the rollable screen 2 is switched from the unrolled state to the rolled state, the driving assembly 6 rotates clockwise to push the first movable plate 3 to move in the horizontal leftward direction. Further, the first movable plate 3 drives the first gear 17 to rotate to fold the first linkage assembly 12. Further, the first linkage assembly 12 transmits power to the second gear 19 to rotate the second gear 19, thus pushing the second movable plate 4 to move in the horizontal rightward direction and close to the first movable plate 3. When the rollable screen 2 is switched from the rolled state to the unrolled state, the driving assembly 6 rotates counterclockwise to push the first movable plate 3 to move in the horizontal rightward direction. Further, the first movable plate 3 drives the first gear 17 to rotate to unfold the first linkage assembly 12. Further, the first linkage assembly 12 transmits power to the second gear 19 to rotate the second gear 19, thus pushing the second movable plate 4 to move in the horizontal leftward direction and away from the first movable plate 3.

In some embodiments, the first linkage assembly 12 further includes a first hinge 20 connected between the first bar 14 and the second bar 15. The first hinge 20 is arranged between the first bar 14 and the second bar 15, so as to achieve the function that the first bar 14 and the second bar 15 cooperate with each other to be folded or unfolded.

In some embodiments, the second linkage assembly 13 includes a third bar 21 and a fourth bar 22. A first end of the third bar 21 is hinged with the first movable plate 3. A first end of the fourth bar 22 is hinged with the second movable plate 4. A second end of the fourth bar 22 is hinged with a second end of the third bar 21. The first movable plate 3 moves forward along the second direction and drives the third bar 21 to rotate counterclockwise, and the third bar 21 drives the fourth bar 22 to rotate clockwise to fold the second linkage assembly 13. The first movable plate 3 moves reversely along the second direction and drives the third bar 21 to rotate clockwise, and the third bar 21 drives the fourth bar 22 to rotate counterclockwise to unfold the second linkage assembly 13. In this embodiment, the second linkage assembly 13 is folded and unfolded by two hinged bars. Specifically, the first end of the third bar 21 (a bottom end of the third bar 21 shown in FIG. 1) is connected to the right end of the first movable plate 3, the first end of the fourth bar 22 (a top end of the fourth bar 22 shown in FIG. 1) is connected to the second movable plate 4, and the second end of the third bar 21 (a top end of the third bar 21 shown in FIG. 1) is hinged with the second end of the fourth bar 22 (a bottom end of the fourth bar 22 shown in FIG. 1). When the rollable screen 2 is switched from the unrolled state to the rolled state, the driving assembly 6 rotates clockwise to push the first movable plate 3 to move in the horizontal leftward direction, so as to further drive the third bar 21 to rotate counterclockwise and the fourth bar 22 to rotate clockwise, such that the second linkage assembly 13 is folded. When the rollable screen 2 is switched from the rolled state to the unrolled state, the driving assembly 6 rotates counterclockwise to push the first movable plate 3 to move in the horizontal rightward direction, so as to further drive the third bar 21 to rotate clockwise and the fourth bar 22 to rotate counterclockwise, such that the second linkage assembly 13 is unfolded.

In some embodiments, the first movable plate 3 is provided with a third tooth portion 23, and the second linkage assembly 13 further includes a third gear 24 fitted with the third tooth portion 23. The third gear 24 is connected to the first end of the third bar 21 and is connected to the third tooth portion 23. In this embodiment, the third gear 24 is arranged to the bottom end of the third bar 21 and abuts against the right end of the first movable plate 3. When the rollable screen 2 is switched from the unrolled state to the rolled state, the driving assembly 6 rotates clockwise to push the first movable plate 3 to move in the horizontal leftward direction. Further, the first movable plate 3 drives the third gear 24 to rotate, thus folding the second linkage assembly 13.

In some embodiments, the second movable plate 4 is provided with a fourth tooth portion 25, and the second linkage assembly 13 further includes a fourth gear 26 fitted with the fourth tooth portion 25. The fourth gear 26 is connected to the first end of the fourth bar 22 and is connected to the fourth tooth portion 25. In this embodiment, the fourth gear 26 is arranged to the top end of the fourth bar 22 and abuts against the right end of the second movable plate 4. When the rollable screen 2 is switched from the unrolled state to the rolled state, the driving assembly 6 rotates clockwise to push the first movable plate 3 to move in the horizontal leftward direction. Further, the first movable plate 3 drives the third gear 24 to rotate to fold the second linkage assembly 13. Further, the second linkage assembly 13 transmits power to the fourth gear 26 to rotate the fourth gear 26, thus pushing the second movable plate 4 to move in the horizontal rightward direction and close to the first movable plate 3. When the rollable screen 2 is switched from the rolled state to the unrolled state, the driving assembly 6 rotates counterclockwise to push the first movable plate 3 to move in the horizontal rightward direction. Further, the first movable plate 3 drives the third gear 24 to rotate to unfold the second linkage assembly 13. Further, the second linkage assembly 13 transmits power to the fourth gear 26 to rotate the fourth gear 26, thus pushing the second movable plate 4 to move in the horizontal leftward direction and away from the first movable plate 3.

In some embodiments, the second linkage assembly 13 further includes a second hinge 27 connected between the third bar 21 and the fourth bar 22. The second hinge 27 is arranged between the third bar 21 and the fourth bar 22, so as to achieve the function that the third bar 21 and the fourth bar 22 cooperate with each other to be folded or unfolded.

In the example shown in the drawings, a side of a left portion of the first movable plate 3 facing to the second movable plate 4 is provided with the first tooth portion 16, and a side of a right portion of the first movable plate 3 facing away from the second movable plate 4 is provided with the third tooth portion 23. A side of a left portion of the second movable plate 4 facing away from the first movable plate 3 is provided with the second tooth portion 18, and a side of a right portion of the second movable plate 4 facing to the first movable plate 3 is provided with the fourth tooth portion 25.

In this way, when the first movable plate 3 moves leftward, the first gear 17 is driven to rotate clockwise and the third gear 24 is driven to rotate counterclockwise, thus driving the first linkage assembly 12 and the second linkage assembly 13 to fold. Further, the second gear 19 is driven to rotate counterclockwise and the fourth gear 26 is driven to rotate clockwise so as to move the second movable plate 4 close to the first movable plate 3, thus driving the rollable screen 2 to be rolled. When the first movable plate 3 moves rightward, the first gear 17 is driven to rotate counterclockwise and the third gear 24 is driven to rotate clockwise, thus driving the first linkage assembly 12 and the second linkage assembly 13 to unfold. Further, the second gear 19 is driven to rotate clockwise and the fourth gear 26 is driven to rotate counterclockwise so as to move the second movable plate 4 away from the first movable plate 3, thus driving the rollable screen 2 to be unrolled.

In another example (not shown), a side of the left portion of the first movable plate facing away from the second movable plate is provided with the first tooth portion, and a side of the right portion of the first movable plate facing to the second movable plate is provided with the third tooth portion. A side of the left portion of the second movable plate facing to the first movable plate is provided with the second tooth portion, and a side of the right portion of the second movable plate facing away from the first movable plate is provided with the fourth tooth portion. That is, when the first movable plate moves, a rotation direction of each gear is opposite to that of each gear in the above embodiment.

In this way, when the first movable plate moves leftward, the first gear is driven to rotate counterclockwise and the third gear is driven to rotate clockwise, so as to drive the first linkage assembly and the second linkage assembly to unfold. Further, the second gear is driven to rotate clockwise and the fourth gear is driven to rotate counterclockwise, so as to move the second movable plate away from the first movable plate, thus driving the rollable screen to be unrolled. When the first movable plate moves rightward, the first gear is driven to rotate clockwise and the third gear is driven to rotate counterclockwise, so as to drive the first linkage assembly and the second linkage assembly to fold. Further, the second gear is driven to rotate counterclockwise and the fourth gear is driven to rotate clockwise, so as to move the second movable plate close to the first movable plate, thus driving the rollable screen to be rolled.

Following descriptions are made by taking the illustrated embodiment as an example, in which the first transmission member 8 is a screw rod and the second transmission member 9 is a gear. When the rollable screen 2 is switched from the unrolled state to the rolled state, the motor 7 rotates clockwise to drive the screw rod to rotate clockwise, so as to drive the gear to rotate clockwise, thus pushing the first movable plate 3 to move in the horizontal leftward direction. Further, the first linkage assembly 12 and the second linkage assembly 13 are driven to fold, so as to further drive the second movable plate 4 to move close to the first movable plate 3 in the vertical direction, such that the rollable screen 2 is retracted into the housing 10. When the rollable screen 2 is switched from the rolled state to the unrolled state, the motor 7 rotates counterclockwise to drive the screw rod to rotate counterclockwise, so as to drive the gear to rotate counterclockwise, thus pushing the first movable plate 3 to move in the horizontal rightward direction. Further, the first linkage assembly 12 and the second linkage assembly 13 are driven to unfold, so as to further push the second movable plate 4 to move away from the first movable plate 3 in the vertical direction, such that the rollable screen 2 may extend out of the housing 10.

The above descriptions are merely the preferred embodiments of the present disclosure and do not limit the present disclosure in any form. Although the present disclosure has been disclosed as above preferred embodiments, these embodiments are not used to limit the present disclosure. Any skilled in the related art may use the disclosed technical content to change or modify the technical solution into equivalent embodiments with equivalent changes, without departing from the scope of the technical solution of the present disclosure. Any simple alterations, equivalent changes and modifications to the above embodiments according to the technical essence of the present disclosure still belong to the scope of the technical solution of the present disclosure, as long as not departing from the technical solution of the present disclosure.

What is claimed is:

1. A foldable mechanism, comprising:
   a first movable plate being below an object to be rolled and supporting the object to be rolled;
   a second movable plate spaced apart from the first movable plate along a first direction, connected to a first end of the object to be rolled, being below and supporting the object to be rolled; and
   a linkage structure movably connected between the first movable plate and the second movable plate,
   wherein the first movable plate is configured to move forward along a second direction to drive the linkage structure to fold, and the linkage structure is configured to drive the second movable plate to move close to the first movable plate along the first direction when the object to be rolled is switched from an unrolled state to a rolled state, in which the second direction is perpendicular to the first direction;
   the first movable plate is configured to move reversely along the second direction to drive the linkage structure to unfold, and the linkage structure is configured to drive the second movable plate to move away from the first movable plate along the first direction when the object to be rolled is switched from the rolled state to the unrolled state,
   wherein the linkage structure comprises:
   a first linkage assembly arranged on a first side of the foldable mechanism, and movably connected to a first end of the first movable plate and a first end of the second movable plate; and
   a second linkage assembly arranged on a second side of the foldable mechanism, and movably connected to a second end of the first movable plate and a second end of the second movable plate,
   wherein the first movable plate is configured to move forward along the second direction, and drive the first linkage assembly and the second linkage assembly to fold, so as to drive the second movable plate to move close to the first movable plate along the first direction;
   the first movable plate is configured to move reversely along the second direction, and drive the first linkage assembly and the second linkage assembly to unfold, so as to drive the second movable plate to move away from the first movable plate along the first direction,
   wherein the first linkage assembly comprises:
   a first bar having a first end hinged with the first movable plate and a second end; and
   a second bar having a first end hinged with the second movable plate, and a second end hinged with the second end of the first bar,
   wherein the first movable plate is configured to move forward to the first side of the foldable mechanism along the second direction to drive the first bar to rotate clockwise, and the first bar is configured to drive the second bar to rotate counterclockwise, so as to fold the first linkage assembly;
   the first movable plate is configured to move reversely to the second side of the foldable mechanism along the second direction to drive the first bar to rotate counterclockwise, and the first bar is configured to drive the second bar to rotate clockwise, so as to unfold the first linkage assembly.

2. The foldable mechanism according to claim 1, further comprising a driving assembly connected to the first movable plate for driving the first movable plate to move along the second direction.

3. The foldable mechanism according to claim 2, wherein the driving assembly comprises:
   a motor;
   a first transmission member connected to the motor; and
   a second transmission member connected to the first transmission member and the first movable plate,
   wherein the motor is configured to rotate clockwise to drive the first transmission member to rotate clockwise, the first transmission member is configured to drive the second transmission member to move away from the motor along the second direction, and the second transmission member is configured to drive the first movable plate to move forward along the second direction;
   the motor is configured to rotate counterclockwise to drive the first transmission member to rotate counterclockwise, the first transmission member is configured to drive the second transmission member to move close to the motor along the second direction, and the second transmission member is configured to drive the first movable plate to move reversely along the second direction.

4. The foldable mechanism according to claim 3, wherein the first transmission member is a screw rod, the second transmission member is a nut fitted with the screw rod, and the screw rod extends along the second direction.

5. The foldable mechanism according to claim 3, wherein the first transmission member is a screw rod, the second transmission member is a gear fitted with the screw rod, and the screw rod extends along the second direction.

6. The foldable mechanism according to claim 3, wherein the first transmission member is a gear, the second transmission member is a rack fitted with the gear, and the rack extends along the second direction.

7. The foldable mechanism according to claim 1, wherein the first movable plate is provided with a first tooth portion, the first linkage assembly further comprises a first gear fitted with the first tooth portion, and the first gear is connected to the first end of the first bar and connected to the first tooth portion.

8. The foldable mechanism according to claim 1, the second movable plate is provided with a second tooth portion, the first linkage assembly further comprises a second gear fitted with the second tooth portion, and the second gear is connected to the first end of the second bar and connected to the second tooth portion.

9. The foldable mechanism according to claim 1, the first linkage assembly further comprises a first hinge connected between the first bar and the second bar.

10. The foldable mechanism according to claim 1, wherein the second linkage assembly comprises:
a third bar having a first end hinged with the first movable plate and a second end; and
a fourth bar having a first end hinged with the second movable plate, and a second end hinged with the second end of the third bar,
wherein the first movable plate is configured to move forward along the second direction to drive the third bar to rotate counterclockwise, and the third bar is configured to drive the fourth bar to rotate clockwise, so as to fold the second linkage assembly;
the first movable plate is configured to move reversely along the second direction to drive the third bar to rotate clockwise, and the third bar is configured to drive the fourth bar to rotate counterclockwise, so as to unfold the second linkage assembly.

11. The foldable mechanism according to claim 10, wherein:
the first movable plate is provided with a third tooth portion, the second linkage assembly further comprises a third gear fitted with the third tooth portion, and the third gear is connected to the first end of the third bar and connected to the third tooth portion.

12. The foldable mechanism according to claim 10, the second movable plate is provided with a fourth tooth portion, the second linkage assembly further comprises a fourth gear fitted with the fourth tooth portion, and the fourth gear is connected to the first end of the fourth bar and connected to the fourth tooth portion.

13. The foldable mechanism according to claim 10, the second linkage assembly further comprises a second hinge connected between the third bar and the fourth bar.

14. A rollable screen structure, comprising:
a rollable screen;
a first movable plate being below and supporting the rollable screen;
a second movable plate spaced apart from the first movable plate along a first direction, connected to a first end of the rollable screen, and being below and supporting the rollable screen; and
a linkage structure movably connected between the first movable plate and the second movable plate,
wherein the first movable plate is configured to move forward along a second direction to drive the linkage structure to fold, and the linkage structure is configured to drive the second movable plate to move close to the first movable plate along the first direction when the rollable screen is switched from an unrolled state to a rolled state, in which the second direction is perpendicular to the first direction;
the first movable plate is configured to move reversely along the second direction to drive the linkage structure to unfold, and the linkage structure is configured to drive the second movable plate to move away from the first movable plate along the first direction when the rollable screen is switched from the rolled state to the unrolled state,
wherein the linkage structure comprises:

a first linkage assembly arranged on a first side of the foldable mechanism, and movably connected to a first end of the first movable plate and a first end of the second movable plate; and
a second linkage assembly arranged on a second side of the foldable mechanism, and movably connected to a second end of the first movable plate and a second end of the second movable plate,
wherein the first movable plate is configured to move forward along the second direction, and drive the first linkage assembly and the second linkage assembly to fold, so as to drive the second movable plate to move close to the first movable plate along the first direction;
the first movable plate is configured to move reversely along the second direction, and drive the first linkage assembly and the second linkage assembly to unfold, so as to drive the second movable plate to move away from the first movable plate along the first direction,
wherein the first linkage assembly comprises:
a first bar having a first end hinged with the first movable plate and a second end; and
a second bar having a first end hinged with the second movable plate, and a second end hinged with the second end of the first bar,
wherein the first movable plate is configured to move forward to the first side of the foldable mechanism along the second direction to drive the first bar to rotate clockwise, and the first bar is configured to drive the second bar to rotate counterclockwise, so as to fold the first linkage assembly;
the first movable plate is configured to move reversely to the second side of the foldable mechanism along the second direction to drive the first bar to rotate counterclockwise, and the first bar is configured to drive the second bar to rotate clockwise, so as to unfold the first linkage assembly.

15. The rollable screen structure according to claim 14, further comprising a rotating shaft, wherein a second end of the rollable screen is connected to and configured to be rolled around the rotating shaft;
the rotating shaft is configured to rotate to roll the second end of the rollable screen onto the rotating shaft when the rollable screen is switched from the unrolled state to the rolled state;
the rotating shaft is configured to rotate to roll the second end of the rollable screen off the rotating shaft when the rollable screen is switched from the rolled state to the unrolled state.

16. The rollable screen structure according to claim 15, wherein the rotating shaft is located on a side of the foldable mechanism away from the rollable screen.

17. The rollable screen structure according to claim 15, wherein the rotating shaft is spaced apart from the foldable mechanism along the first direction.

18. An electronic device, comprising:
a housing; and
a rollable screen structure coupled to the housing, and comprising:
a rollable screen;
a first movable plate being below and supporting the rollable screen;
a second movable plate spaced apart from the first movable plate along a first direction, connected to a first end of the rollable screen, and being below and supporting the rollable screen; and
a linkage structure movably connected between the first movable plate and the second movable plate, wherein the first movable plate is configured to move forward along a second direction to drive the linkage structure to fold, and the linkage structure is configured to drive the second movable plate to move close to the first movable plate along the first direction when the rollable screen is switched from an unrolled state to a rolled state, so as to retract the first end of the rollable screen to the housing, in which the second direction is perpendicular to the first direction;

the first movable plate is configured to move reversely along the second direction to drive the linkage structure to unfold, and the linkage structure is configured to drive the second movable plate to move away from the first movable plate along the first direction when the rollable screen is switched from the rolled state to the unrolled state, so as to move the first end of the rollable screen away from the housing, wherein the linkage structure comprises:

a first linkage assembly arranged on a first side of the foldable mechanism, and movably connected to a first end of the first movable plate and a first end of the second movable plate; and a second linkage assembly arranged on a second side of the foldable mechanism, and movably connected to a second end of the first movable plate and a second end of the second movable plate, wherein the first movable plate is configured to move forward along the second direction, and drive the first linkage assembly and the second linkage assembly to fold, so as to drive the second movable plate to move close to the first movable plate along the first direction;

the first movable plate is configured to move reversely along the second direction, and drive the first linkage assembly and the second linkage assembly to unfold, so as to drive the second movable plate to move away from the first movable plate along the first direction, wherein the first linkage assembly comprises:

a first bar having a first end hinged with the first movable plate and a second end; and a second bar having a first end hinged with the second movable plate, and a second end hinged with the second end of the first bar, wherein the first movable plate is configured to move forward to the first side of the foldable mechanism along the second direction to drive the first bar to rotate clockwise, and the first bar is configured to drive the second bar to rotate counterclockwise, so as to fold the first linkage assembly;

the first movable plate is configured to move reversely to the second side of the foldable mechanism along the second direction to drive the first bar to rotate counterclockwise, and the first bar is configured to drive the second bar to rotate clockwise, so as to unfold the first linkage assembly.

* * * * *